United States Patent
Huelsemann

(12) United States Patent (10) Patent No.: US 7,021,444 B2
Huelsemann (45) Date of Patent: Apr. 4, 2006

(54) FRICTION CLUTCH FOR A DRIVE ASSEMBLY OF A MOTOR VEHICLE

(75) Inventor: Ulrich Huelsemann, Neuhausen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 3 days.

(21) Appl. No.: 10/789,447

(22) Filed: Mar. 1, 2004

(65) Prior Publication Data

US 2004/0251108 A1 Dec. 16, 2004

(30) Foreign Application Priority Data

Feb. 28, 2003 (DE) .............................. 103 08 771

(51) Int. Cl.
*F16D 25/08* (2006.01)

(52) U.S. Cl. .............. 192/85 CA; 192/91 A; 192/98

(58) Field of Classification Search ........... 192/85 CA, 192/91 A, 98, 112, 115; 92/128, 161, 169.1, 92/171.1
See application file for complete search history.

(56) References Cited

U.S. PATENT DOCUMENTS

| | | | |
|---|---|---|---|
| 4,102,446 A | 7/1978 | Rist | 192/91 |
| 4,848,549 A | 7/1989 | Kammler et al. | 192/85 |
| 4,991,702 A * | 2/1991 | Ladin | 192/85 C |
| 5,133,439 A | 7/1992 | Shellhause | 192/85 |
| 5,183,141 A | 2/1993 | Abe et al. | 192/91 |
| 5,186,297 A | 2/1993 | Owada et al. | 192/85 |
| 5,207,306 A | 5/1993 | Sato et al. | 192/0.084 |
| 5,722,520 A * | 3/1998 | Beyer | 192/13 R |
| 5,752,591 A * | 5/1998 | Beyer | 192/85 C |
| 5,810,145 A | 9/1998 | Thomire | 192/85 |
| 5,823,308 A * | 10/1998 | Ladin et al. | 192/13 R |
| 6,345,710 B1 * | 2/2002 | Welter et al. | 192/85 CA |
| 6,719,115 B1 * | 4/2004 | Rogner et al. | 192/85 CA |

FOREIGN PATENT DOCUMENTS

| | | |
|---|---|---|
| DE | 36 23 627 | 1/1988 |
| DE | 196 37 106 | 3/1997 |
| DE | 196 04 159 | 4/1998 |
| DE | 694 22 276 | 5/2000 |
| DE | 697 16 573 | 6/2003 |
| EP | 0383576 | 8/1990 |
| EP | 0 433 466 | 6/1991 |
| EP | 0 497 164 | 8/1992 |
| FR | 2735726 | 12/1996 |

* cited by examiner

*Primary Examiner*—Saul Rodriguez
(74) *Attorney, Agent, or Firm*—Crowell & Moring LLP

(57) ABSTRACT

A friction clutch intended for a drive assembly of a motor vehicle, operates between an internal-combustion engine and a transmission. The clutch has a clutch release device arranged inside a transmission/clutch housing and has a clutch release bearing and a hydraulic operating device with a cylinder housing and an operating piston operating in the cylinder housing. For optimizing the clutch release device of the friction clutch, the cylinder housing of the hydraulic operating device of the clutch release device is mounted on a bearing structure arranged adjacent to the internal-combustion engine and the friction clutch, which bearing structure is constructed independently of the clutch housing.

13 Claims, 4 Drawing Sheets

FRICTION CLUTCH FOR A DRIVE ASSEMBLY OF A MOTOR VEHICLE

BACKGROUND AND SUMMARY OF THE INVENTION

This application claims the priority of German Patent Application No. 10308771.0, filed Feb. 28, 2003, the disclosure of which is expressly incorporated by reference herein.

The invention relates to a friction clutch for a drive assembly of a motor vehicle which operates between an internal-combustion engine and a transmission.

A known friction clutch of the initially mentioned construction—U.S. Patent Document U.S. Pat. No. 5,183,141—is equipped with a clutch release device arranged inside a housing surrounding the friction clutch. The clutch release device has a release bearing and a hydraulic operating device which comprises an outer cylinder housing fastened to the housing and an inner operating piston, the operating piston being axially movably arranged in the cylinder housing and cooperating with a release bearing or a diaphragm spring of the clutch. A comparable construction is known from German Patent Document DE 694 22 276 T2. However, in this case, an inner cylinder housing of the hydraulic operating device is fixedly connected with a wall of the housing and a displaceable operating piston surrounds these cylinder housings.

It is an object of the invention to equip a friction clutch provided between an internal-combustion engine and a transmission with a clutch release device which accommodates a hydraulic operating mechanism appropriately with respect to its function and can be installed in a simple manner in the area between the internal-combustion engine and the transmission.

According to the invention, this object is achieved by providing a friction clutch for a drive assembly of a motor vehicle which operates between an internal-combustion engine and a transmission and comprises a clutch release device, the clutch release device being arranged inside a transmission/clutch housing having a clutch release bearing and a hydraulic operating device with a cylinder housing and an operating piston operating in the latter, wherein the cylinder housing of the hydraulic operating device is mounted on a bearing structure arranged in use adjacent to the internal-combustion engine and the friction clutch, which bearing structure is constructed independently of the transmission/clutch housing.

Important advantages achieved by means of certain preferred embodiments of the invention are that the bearing structure has a stiff construction and securely accommodates the clutch release bearing and the cylinder housing. In this case, since the bearing structure is constructed independently of the transmission housing, it contributes to a considerable extent to the free design of the friction clutch. A holding of the bearing structure which is appropriate for its function is achieved by fastening it to the front end of the internal-combustion engine. As a result of the bearing plate and the fastening struts, the bearing structure can be optimized in a simple manner with respect to the weight, stability and space requirements. According to certain embodiments these advantages are also promoted by the fact that the bearing plate has approximately the shape of an equilateral triangle on whose vertices the fastening struts are mounted. Finally, according to certain preferred embodiments the fact that the fastening struts and the cylinder housing are made of one piece with the bearing plate contributes to the constructional simplification.

Other objects, advantages and novel features of the present invention will become apparent from the following detailed description of the invention when considered in conjunction with the accompanying drawings.

DETAILED DESCRIPTION OF THE DRAWINGS

Figure 1:
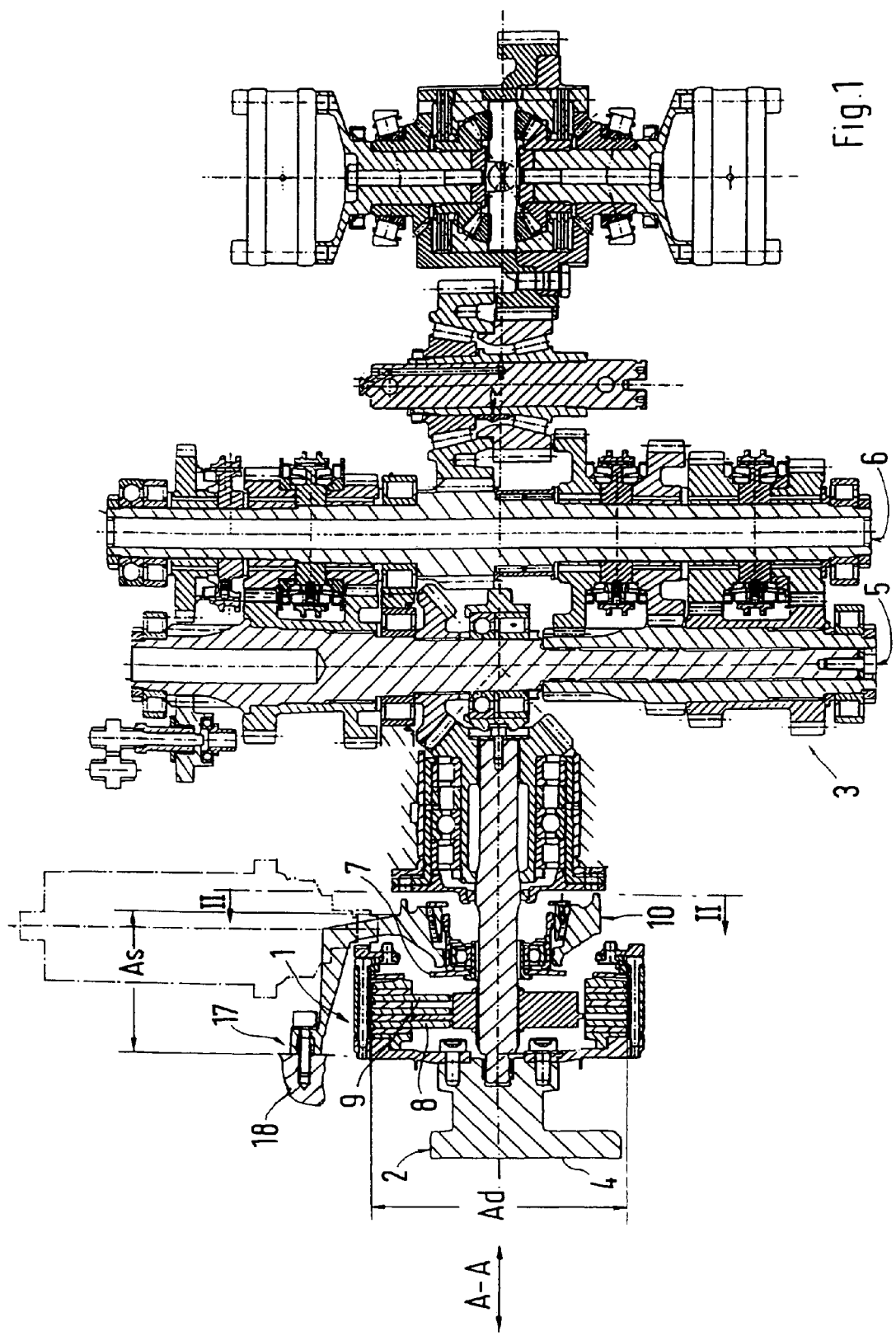
FIG. 1 is a longitudinal sectional view of a friction clutch constructed according to a preferred embodiment of the invention shown interposed between a vehicle engine and transmission.
Figure 3:
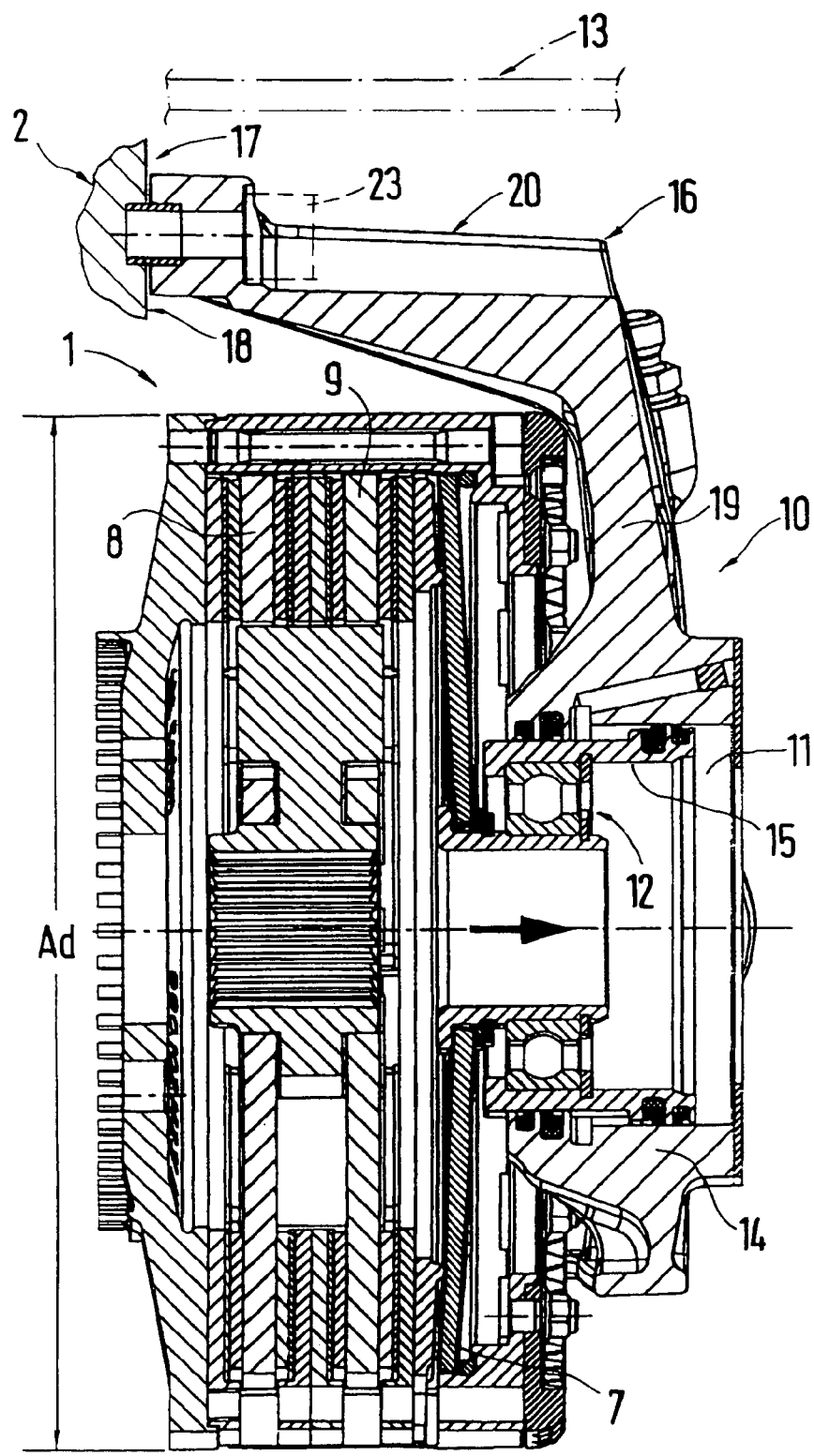
FIG. 3 is a sectional view taken along line III—III of FIG. 2.

A friction clutch 1 is a component of a drive assembly which can be installed into a motor vehicle and operates between an internal-combustion engine 2 and a transmission 3. A crankshaft 4 of the internal-combustion engine 2 is schematically illustrated. Two shafts 5 and 6, which carry gear wheels 5 and 6 and which extend transversely to a longitudinal direction A—A of the vehicle—FIG. 1—, of the transmission 3 are also shown schematically Referring to FIG. 3, a clutch release device 10, which has a hydraulic operating device 11, interacts with a diaphragm spring 7 of the friction clutch 1 having several clutch disks 8 and 9. The clutch release device 10 comprising a release bearing 12 is arranged with an operating device 11 inside a transmission and clutch housing 13, the operating device 11 being equipped with a cylinder housing 14 in which an axially movable operating piston 15 is operative.

The cylinder housing 14 of the hydraulic operating device 11 is connected with a bearing structure 16, which is arranged adjacent to the internal-combustion engine 2 and the friction clutch 1, independently of the housing 13 surrounding the latter. The bearing structure 16 is fastened to a face 17 or to a wall 18 of the internal-combustion engine 2 and has a bearing plate 19 arranged at a distance As from the face 17 or the wall 18 and the friction clutch 1. The cylinder housing 14 and the fastening struts 20, 21 and 22 are connected with the bearing plate 19. The fastening struts 20, 21 and 22, which extend away from the bearing plate 10 at approximately a right angle, reach around an outside diameter Ad of the friction clutch 1, are supported on the wall 18, and are held in position on the wall 18 of the internal-combustion engine 2 by means of screws 23.

Figure 2:
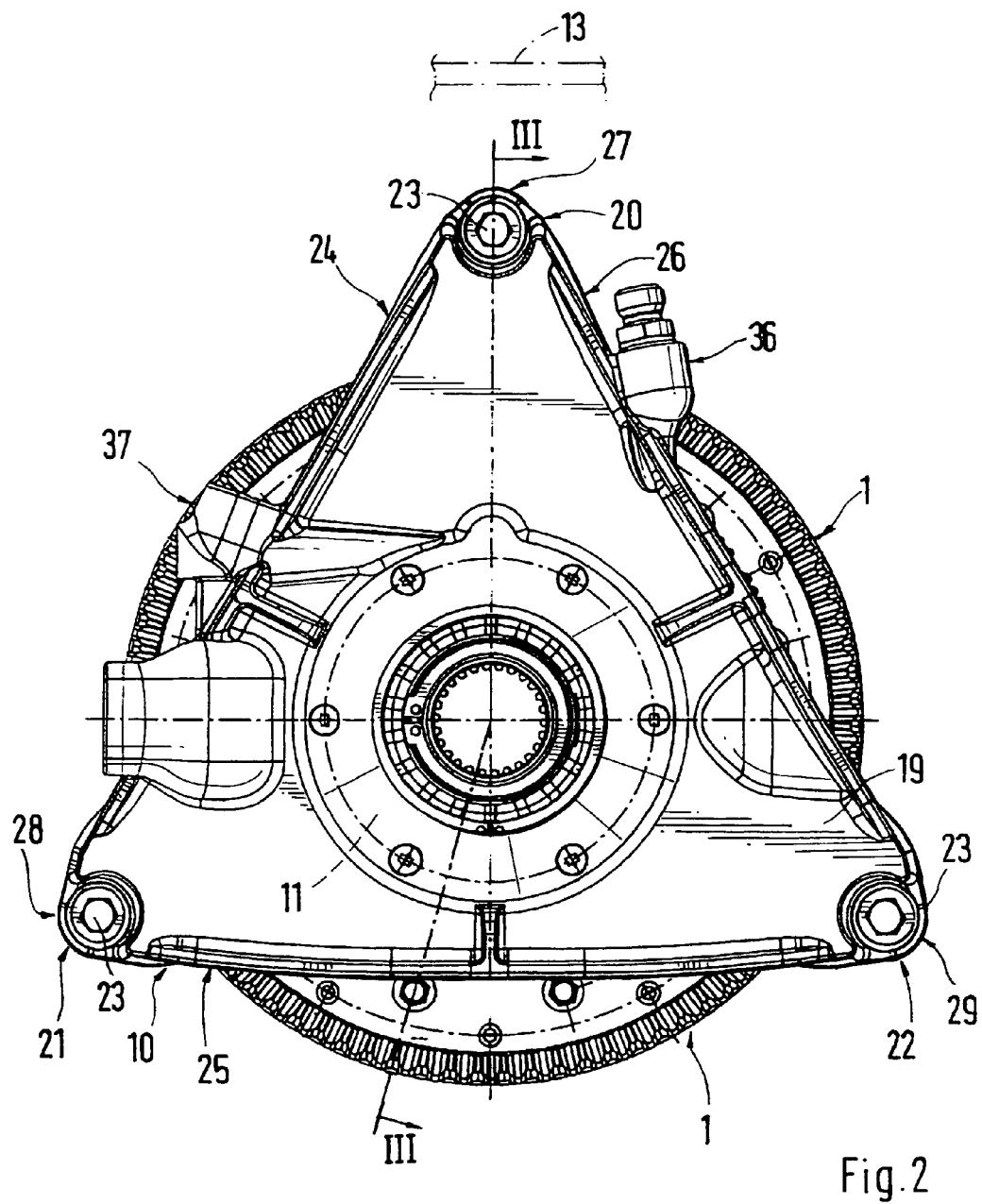
FIG. 2 is an enlarged sectional view taken along Line II—II of FIG. 1.

According to FIG. 2, the bearing plate 19 has approximately the shape of an equilateral triangle with sides 24, 25 and 26 on whose vertexes 27, 28 and 29 the fastening struts 20, 21 and 22 are mounted. In this case, the fastening struts 20, 21 and 22, which surround the friction clutch 1, are made of one piece with the bearing plate 19; this analogously applies to the cylinder housing 14. The bearing plate 19 designed in such a manner is constructed as a cast part of a light-metal or iron-metal type.

Figure 4:
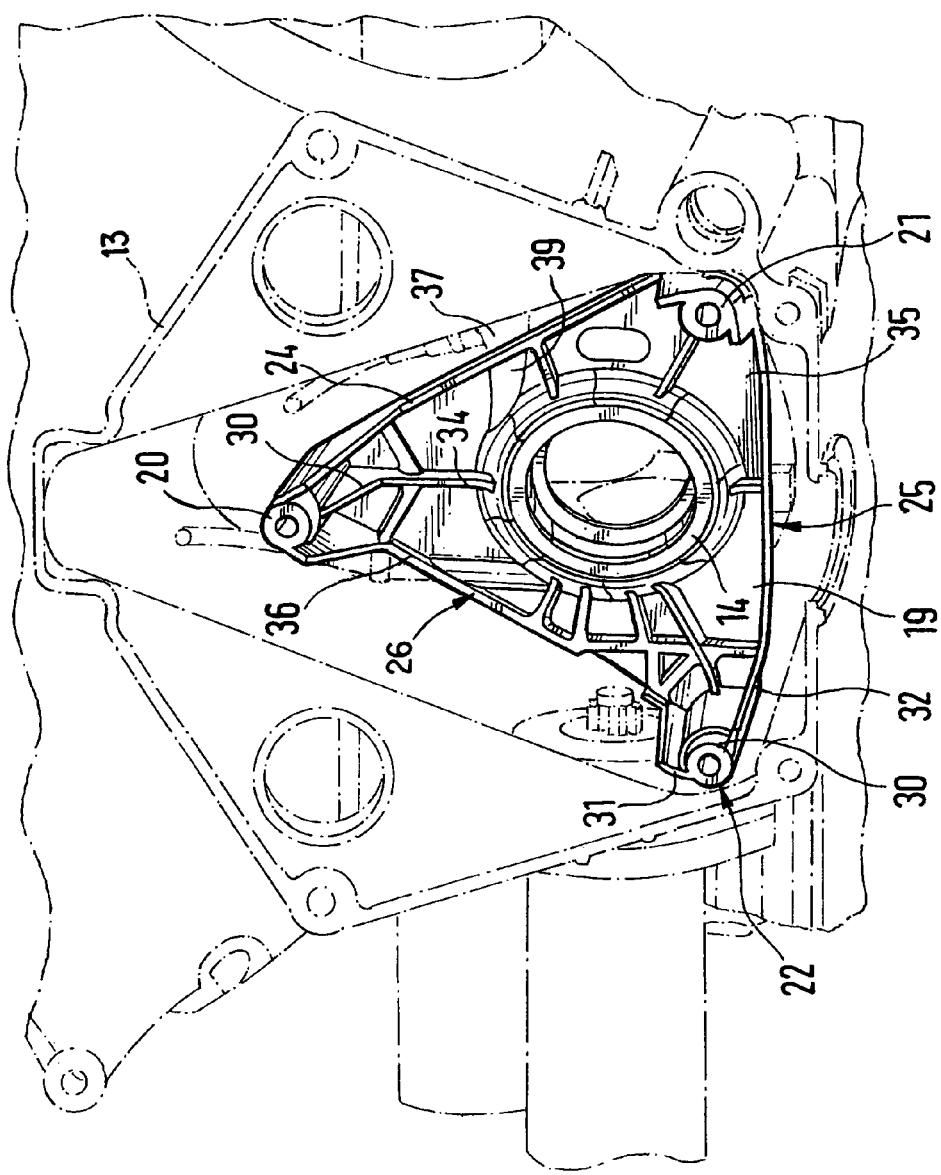
FIG. 4 is a perspective view of the inside of the housing for the friction clutch of FIG. 1.

According to FIG. 4, each fastening strut, such as 21, has a strut eye 30 with a circular-cylindrical cross-section. Tangentially relatively short stiffening flanges 31 and 32, which lead in the direction of the sides 21 and 22, extend away from this strut eye 30. Additionally, the fastening struts 20, 21 and 22 or the strut eyes 30 can be supported by means of web-type attachment struts which merge into reinforcing ribs 34. On the whole, an interior side 35 of the bearing plate 19 is equipped with a plurality of different ribs which provide the bearing plate 19 with a defined stability and holds the cylinder housing 14 corresponding to its function on the latter. Finally, connections 36 and 37 and lines 38 and 39 for the hydraulic operating device 11 are integrated in the bearing plate 19.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Friction clutch for a drive assembly of a motor vehicle which operates between an internal-combustion engine and a transmission and comprises a clutch release device, the clutch release device being arranged inside a transmission/clutch housing having a clutch release bearing and a hydraulic operating device with a cylinder housing and an operating piston operating in the latter,
   wherein the cylinder housing of the hydraulic operating device is mounted on a bearing structure arranged adjacent to the internal-combustion engine and the friction clutch, which bearing structure is constructed independently of the transmission/clutch housing,
   wherein the bearing structure is fastened to a wall of the internal-combustion engine forming a face,
   wherein the bearing structure is equipped with a bearing plate arranged at a distance from the wall of the internal-combustion engine and from the friction clutch, on which bearing plate the cylinder housing of the operating device is mounted, and
   wherein the bearing plate is provided with fastening struts which are oriented toward the wall, reach around an outside diameter of the friction clutch, are supported on the wall and are fastened to that wall by means of screws.

2. Friction clutch according to claim 1, wherein each fastening strut has a strut eye with a circular-cylindrical cross-section, and
   wherein relatively short stiffening flanges extend tangentially away from the strut eye.

3. Friction clutch according to claim 1, wherein the bearing plate has approximately the shape of an equilateral triangle with sides, at whose vertexes the fastening struts are mounted.

4. Friction clutch according to claim 2, wherein the bearing plate has approximately the shape of an equilateral triangle with sides, at whose vertexes the fastening struts are mounted.

5. Friction clutch according to claim 1, wherein the fastening struts are made in one piece with the bearing plate.

6. Friction clutch according to claim 3, wherein the fastening struts are made in one piece with the bearing plate.

7. Friction clutch according to claim 4, wherein the fastening struts are made in one piece with the bearing plate.

8. Friction clutch according to claim 1, wherein the fastening struts are made in one piece with the bearing plate.

9. Friction clutch according to claim 2, wherein the fastening struts are made in one piece with the bearing plate.

10. Friction clutch according to claim 5, wherein the fastening struts are made in one piece with the bearing plate.

11. Friction clutch according to claim 1, wherein the bearing plate is constructed as a cast part of a light-metal or iron-metal.

12. Friction clutch according to claim 5, wherein the bearing plate is constructed as a cast part of a light-metal or iron-metal.

13. Friction clutch according to claim 11, wherein connections and lines for the hydraulic operating device are integrated in the bearing plate.

* * * * *